Dec. 13, 1932.　　　H. MEYER　　　1,890,821
PRESSURE REDUCING VALVE
Filed Sept. 8, 1930
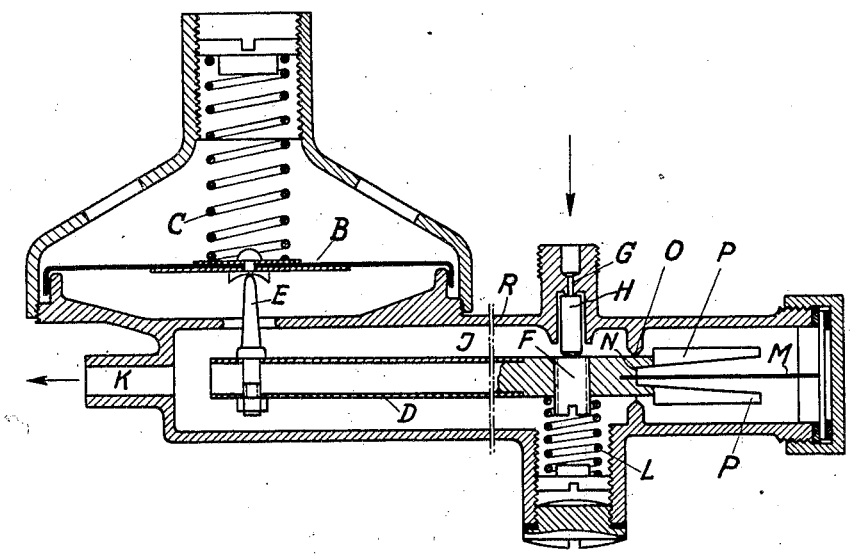
Inventor:
Hans Meyer
by
　　　Attorney Patented Dec. 13, 1932

1,890,821

UNITED STATES PATENT OFFICE

HANS MEYER, OF KIEL-WELLINGDORF, GERMANY, ASSIGNOR TO DEUTSCHE GASGLUHLICT-AUER-GESELLSCHAFT M. B. H., OF BERLIN, GERMANY, A CORPORATION OF GERMANY

PRESSURE REDUCING VALVE

Application filed September 8, 1930, Serial No. 480,359, and in Germany September 14, 1929.

The subject matter of the present invention relates to pressure reducing valves with or without a middle pressure chamber, particularly for breathing apparatus and in the special construction as automaton for the lungs or as admission press-button. In valves of this type the transmission of forces is effected in general by a system of pivotally arranged levers. The mounting of these levers on the valve casing must be done in such a manner, that even slight forces will suffice in order to effect a turning of the levers, on the other hand any play must be avoided, if the valve is expected to operate properly. Up to the present it was customary to provide the valves in general with pins, adapted to turn in snugly fitting borings provided in the casing. The inconveniences of such a mounting are obvious. Special care must be exercised in the manufacture of the said devices in order to attain the required conditions. During work friction will easily be increased in that foreign bodies will get into the bearings or that the pins become stuck in the borings. This latter danger is particularly imminent with valves operated on oxygen, since these must not be lubricated on account of the danger of explosions. Moreover, it will easily happen that on the metal parts a layer is formed by corrosion, which will cover the stationary and movable parts and obstruct the operation of the levers or prevent the latter from moving altogether.

The drawbacks referred to are obviated according to the invention by a novel elastic mounting of the levers on the casing, so that any sliding motion will entirely be dispensed with. Such a mounting can be effected for instance, in that the pins of the levers are replaced by spring coils. But according to the invention it is more advantageous to make use of only one leaf spring suitably arranged in the plane of the lever, since a leaf-spring is movable in one plane only and will not permit any motion in other planes with the forces coming into consideration. The leaf-spring may be produced to advantage by making the lever tubular, and flattening one portion of the said tube in such a manner as to close the internal space and form two layers in mutual contact. The said flattened portion possesses the same properties as a leaf-spring. If it is desired to render it more flexible yet, it is preferable to remove the edge thereof, so that two superposed resilient surfaces are produced. In lieu of flattening out one portion of the tube, a certain portion of the wall of said tube may be removed over a definite distance and the remaining portion is then rendered flat. In this manner a simple leaf-spring is produced. These manufacturing methods of the leaf-springs are particularly suitable, if the outermost extremity of the lever, namely that point, where the leaf-spring is to be secured to the casing, is not transformed but left as a tube, enabling the end of the tube to be slid over a pin, obtaining in this way a particularly simple kind of attachment. The pivot of the lever may, in this case be the point where the leaf-spring is secured to the housing. A construction of this type however shows a serious drawback. In order to render the lever provided with a leaf-spring as easily movable as possible, the said leaf-spring should be of rather great length otherwise the ratio of length of the levers upon which the forces act, is determined by the requirements to be met by the valve, so that rather large dimensions of the valve would be obtained. According to the invention this inconvenience is obviated in that the turning of the lever is effected in a pivot arranged at the level of the point of attachment of the leaf-spring to the lever. The length of the lever and leaf-spring may then be determined independently of one another. The pivot for the lever could also be arranged at some other points of the lever or leaf-spring, however, in this case the force exerted by the said leaf-spring and which according to its length will vary will always be higher than with the provision of the pivot at the level of the point of attachment of the leaf-spring to the lever. From this follows for the arrangement according to the invention the further advantage, that the properties of the valve are effected by the leaf-spring as little as possible.

According to the invention the turning of the lever is effected in that at the level of the point of attachment of the leaf-spring to the lever a knife-edge is provided, coming into engagement with the said lever, or the latter may be forced against said edge by a spring. A circular construction of the said edge is of particular advantage, since it can be manufactured at low cost and since it is possible without difficulty to obtain any desired play between the lever and the said knife-edge.

With valves having long levers, particularly with automatic devices for the lungs or particularly sensitive dosing valves, the weight of the lever may become noticeable in that just according to the position of the valve in the space, it will either assist or reduce the effect of the loading spring. This drawback is obviated according to the invention in that the lever is extended beyond its pivot by means of counter-weights, so that the turning momentum of the lever becomes equal to zero. By this arrangement the influence of the weight of the lever upon the mode of operation is completely cut out and the valve will operate uniformly in every position. Preferably those counter-weights are dovetailed, so that the mobility of the leaf-spring is not obstructed thereby.

An embodiment of the arrangement according to the invention is illustrated diagrammatically by way of example in the drawing.

A represents the valve housing, B the diaphragm. D is the valve lever with the stud E extending to the diaphragm and the adjusting screw F. The high-pressure medium is admitted through the high-pressure nozzle G, which can be closed by means of the valve H, into the central pressure chamber J of the valve housing. At K the dosing nozzle can be arranged. The counter-spring L will exert a closing action upon the high pressure admission valve H. The attachment of the lever D to the housing is effected by means of the leaf-spring M secured to the lever at N. In the same plane with the point of connection of the lever with the spring, there is arranged the circular knife-edge O about which the lever can turn. The two counter-weights P are adapted to compensate the momentum of the lever on the opposite side.

The circular knife-edge O surrounds the lever D. The weights P balance the lever so that the appliance will work equally well in any position. These weights are preferably of dovetail shape, as shown, that is to say, their inner or adjacent surfaces flare away from the fulcrum formed by the knife-edge O, so that movement of the lever D will not bring the weights in contact with the spring M.

The valve will operate like a pressure reducing valve of the usual construction, so that a description of the other parts and an explanation of the mode of operation can be dispensed with.

If the subject matter of application is to be employed as automatic device for the lungs, the ratio of the lever and the diaphragm are dimensioned accordingly, and in this case the breathing bag may be substituted for the diaphragm. The dosing nozzle will be dispensed with, so that atmospheric pressure obtains inside of the pressure reducing valve and there will be no central pressure chamber.

If the subject matter of application is to be utilized as admission press button, the diaphragm is provided with a button, the actuation of which will release the high-pressure admission nozzle. In this instance the spring C obviously can be dispensed with.

I claim:

1. A pressure reducing valve comprising a housing, a valve therein, a lever controlling said valve, a spring secured to said housing and to said lever, and a knife edge on said housing adjacent to the joint of the lever with said spring constituting a fulcrum for said lever and stabilizing the pivotal movements thereof, the weight of said lever being approximately balanced relatively to said fulcrum, so that the valve will operate equally well in any position.

2. A pressure reducing valve comprising a housing, a valve therein, a lever controlling said valve, a leaf spring secured to said housing and to said lever, a knife edge on said housing adjacent to the joint of said lever with said spring constituting a fulcrum for said lever, and stabilizing the pivotal movements thereof, and balancing weights on said lever on opposite sides of said spring, the opposing surfaces of said weights diverging away from said fulcrum.

3. A pressure reducing valve comprising a housing, a valve therein, a tubular lever controlling said valve, a spring comprising an integral flattened portion of said lever and secured to said housing, and a knife edge on said housing adjacent to the lever end of said spring constituting a fulcrum for said lever and stabilizing the pivotal movements thereof.

In testimony whereof I affix my signature.

HANS MEYER.

CERTIFICATE OF CORRECTION.

Patent No. 1,890,821.  December 13, 1932.

HANS MEYER.

It is hereby certified that the name of the assignee in the above numbered patent was erroneously described and specified as "Deutsche Gasgluhlict-Auer-Gesellschaft m. b. H.", whereas said name should have been described and specified as "Deutsche Gasglühlicht-Auer-Gesellschaft m. b. H.", as shown by the records of assignments in this office; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.